United States Patent [19]

Masters

[11] Patent Number: 5,212,772
[45] Date of Patent: May 18, 1993

[54] SYSTEM FOR STORING DATA IN BACKUP TAPE DEVICE

[75] Inventor: Daniel R. Masters, San Diego, Calif.

[73] Assignee: Gigatrend Incorporated, Carlsbad, Calif.

[21] Appl. No.: 653,777

[22] Filed: Feb. 11, 1991

[51] Int. Cl.[5] .................. G06F 12/00; G06F 13/00
[52] U.S. Cl. .................. 395/200; 364/236.3; 364/248.2; 364/246.4; 364/284.1; 364/285.1; 364/DIG. 1
[58] Field of Search ... 364/200 MS File, 900 MS File; 395/200, 250, 425, 700, 114, 575; 360/39, 72.1; 371/10.1, 13, 21.1, 40.1

[56] References Cited

U.S. PATENT DOCUMENTS

| | | | |
|---|---|---|---|
| 4,467,421 | 8/1984 | White | 364/200 |
| 4,613,954 | 9/1986 | Sheth | 364/900 |
| 4,675,807 | 6/1987 | Gourneau et al. | 395/275 |
| 4,689,767 | 8/1987 | Stevenson et al. | 364/900 |
| 4,758,906 | 7/1988 | Culp | 360/39 |
| 4,792,898 | 12/1988 | McCarthy et al. | 364/200 |
| 4,858,039 | 8/1989 | Mintzlaff | 360/72.2 |
| 4,891,784 | 1/1990 | Kato et al. | 364/900 |
| 4,916,561 | 4/1990 | Ng et al. | 360/74.1 |
| 4,974,189 | 11/1990 | Russon et al. | 364/900 |
| 5,016,009 | 5/1991 | Whiting et al. | 341/67 |
| 5,133,065 | 7/1992 | Cheffetz et al. | 395/575 |
| 5,163,136 | 11/1992 | Richmond | 395/275 |

OTHER PUBLICATIONS

Uyless D. Black; Data Communications, Networks and Distributed Processing; 1983; pp. 175–208.

Primary Examiner—Gareth D. Shaw
Assistant Examiner—Dennis M. Butler
Attorney, Agent, or Firm—Majestic, Parsons, Siebert & Hsue

[57] ABSTRACT

In a distributed computer environment such as a PC local area network, a backup tape device and a tape server are used for recording data from the nodes in the network for backup purposes and for controlling the flow of data. The tape server keeps track of a list of nodes which are collecting data for backup purposes. The tape server sequentially polls each node on the list and causes blocks of data from the nodes to be multiplexed and tagged as to the node origin of each block of data and causes the multiplexed blocks to be recorded by the tape device in an interleaved format. The tape location at which the blocks are recorded on tape are sent to the nodes and recorded in the node backup database. The backup data can therefore be restored since the tape locations of the blocks are known to the nodes.

20 Claims, 5 Drawing Sheets

1

SYSTEM FOR STORING DATA IN BACKUP TAPE DEVICE

BACKGROUND OF THE INVENTION

This invention relates in general to data backup systems and in particular, to a system for storing data in one or more backup tape devices.

In many distributed computer environments such as the personal computer local area networks (PC LANs), it is necessary to record data as backup. This is crucial, for example, in certain networks such as in networks for recording airline reservations.

Network backup applications, like other types of data management, is faced with new challenges in distributed environments such as PC LANs.

Because data is often distributed among many nodes on a net, backup performance has been a real problem. In fact, none of the current strategies have significantly reduced "network overhead." However, this invention introduces a new technology which provides a very elegant solution to the apparent complexity of distributed data management. Discussed below are the advantages of shared network backup in the light of this new technology. Specifically, this new technology disspells the myth that a fileserver based solution is the only way to achieve high performance.

Plenty has been written about the details of the more common backup solutions. Highlighted below are aspects of these existing applications which are germaine to the goals of the invention.

The earliest network backup applications put the tape device at a workstation, providing a backup solution for files which could be accessed over the network as well as local data. The performance of these applications were limited by local disk performance and network communication overhead. The result is software which, however functional, falls quite short of the performance capabilities of the streaming tape devices being introduced into the market. For some time, these particular applications were the only way of doing full server disk backups, which greatly intensified the performance problem.

Today, "shared" backup systems which put the tape device at the file server have become popular. Some of these can back server data up at the theoretical rate of the streaming tape device. They can also be used to back up other servers as well as work stations on the net. However, all data not residing at the "host" server is still backed up quite slowly while continuing to significantly impact the network.

The problem remains, then, that unless a tape device is positioned at nearly every node, overall performance is low and the impact to the network is high. The result is that, for a grouping number of functioning LANs, this essential data management function continues to interrupt normal network operations for prohibitively long periods. These applications purport to add value to streaming tape devices. But, because they have not beerable to fully utilize device potential, they have actually been value reducing.

SUMMARY OF THE INVENTION

As indicated above, a major problem in conventional network backup applications is that the speed of data collection and delivery at the nodes (which may be personal computers, work stations, file servers in the network, or other processors) of a network is much slower than that of the streaming tape devices used for recording the backup data from the nodes. In the conventional network backup system, the tape device communicates with one node at a time until all the data from such node has been collected and delivered to the tape device for backup recording purposes before the tape device starts communication with a different node. The great disparity in the speed of data delivery from the node and that of the streaming tape device either causes the tape device to record blanks on tape while it is waiting for data from the node or to stop altogether if the delay in data delivery to the tape device exceeds a certain limit. This is undesirable.

A tape device uses a tape for recording backup data from the nodes of a network. The tape medium is serial in nature and in that sense is quite different from a hard disk or a memory chip where data can be readily accessed without performing rewinding or fast forward operations as in tape devices.

This invention is based on the observation that the above-described difficulties of the conventional tape backup system are alleviated by causing the tape device to record only part of the data that is to be recorded from a first node, polling a second node for more data so that the first node is allowed more time to collect data before it is called on to provide more data. This is preferably and conveniently done by multiplexing the data collected by different nodes in the network and causing the multiplexed data to be delivered to the tape device for recording. Since the tape device is recording data delivered by a number of nodes in the network, the amount of data collected and delivered to the tape device is supplied at a much faster rate compared to the conventional system so that the rate of data collection and delivery can be made to match the speed of the streaming tape device. Consequently, the tape device need not record blanks on tapes and would not stop because of undue delays, and efficiency of the backup operation is greatly enhanced.

One aspect of the invention is directed towards the system for storing data collected by a plurality of nodes where the nodes are connected to form a network. The system comprises a tape backup recording device and a tape server. The tape server sequentially polls a first and a second node as to whether the nodes are collecting data for recording by the tape device, and causes the data supplied by the nodes to be recorded by the device. Before the first node has collected all of the data for recording by the tape device, the tape server proceeds to poll a second rode for data collected.

According to another aspect of the invention, when the block of data from a particular node is collected and transferred to the tape device for recording, the block of data is tagged on tape to identify the block of data and to identify the node from which the block of data is collected. The tape server then proceeds to poll a different node, causing a block of data from such different node to be recorded next to the previous block of data, where such subsequent blocks are also tagged in a similar manner. In other words, the blocks of data from the different nodes are interleaved when recorded on tape. The tagging of the blocks permits ready and easy retrieval of the blocks of data where restoration of the data to the nodes is desired.

According to yet another aspect of the invention, at least the starting location of the tape is sent to the database of the nodes for easy access and restoration of the data to the nodes.

It is known that distributed processing is a powerful resource that is potentially available in most LAN environments. The above described system shows that its use in the area of data management :;ill have large impact to PC LAN computing. So much so that currently perceived weaknesses of LANs with regard to data management will virtually disappear. It is believed that the exciting breakthroughs in the area of data archival and backup described herein is strong evidence of this belief.

DETAILED DESCRIPTION OF THE INVENTION

At the heart of our new technology is a distributed technique which makes it possible to provide data for backup at an extremely high rate. Surprisingly, this technique requires no additional hardware resources. The rate at which data can be provided is proportional to the number of nodes which can be employed in the operation. Using the TurboDAT tape system available from GigaTrend of Carlsbad, Calif., a typical four node network is backed up at 11–14 megabytes per minute (three 10 mHz 286 work stations, 386sx server, 10mb ethernet).

If one wishes to share a tape backup device among several nodes, data transfer over the net is unavoidable. Since the transfer of this data impacts the network, shared backup is usually performed after normal operating hours. The philosophy underlying this invention, therefore, is to fully utilize these resources to complete the backup in a minimal amount of time.

So an integral module of this system is a highly efficient communication protocol based on datagram or packet level network services. Beside providing efficient utilization of network bandwidth, fitting communications in at this level facilitates interoperability as well as migration to new topologies.

Because the backup data is provided from a multipoint source which acts in a highly predictable manner, much of the processing overhead required by normal network traffic is eliminated. Initial efforts have yielded a raw data rate of over 750 kbytes per second on standard 10 mb ethernet. Ultimately, the throughput of the system described herein will approach the bandwidth of the medium. This is especially so since the "high-speed" commercial packages for the same environment are boasting a peak of 250 kbytes per second.

This high throughput stream of data must then be received by a node which acts as an "archive server," or "tape server", transferring the data to one or more tape devices. It is believed that a work station is vastly superior to a file server for this task.

Figure 1:
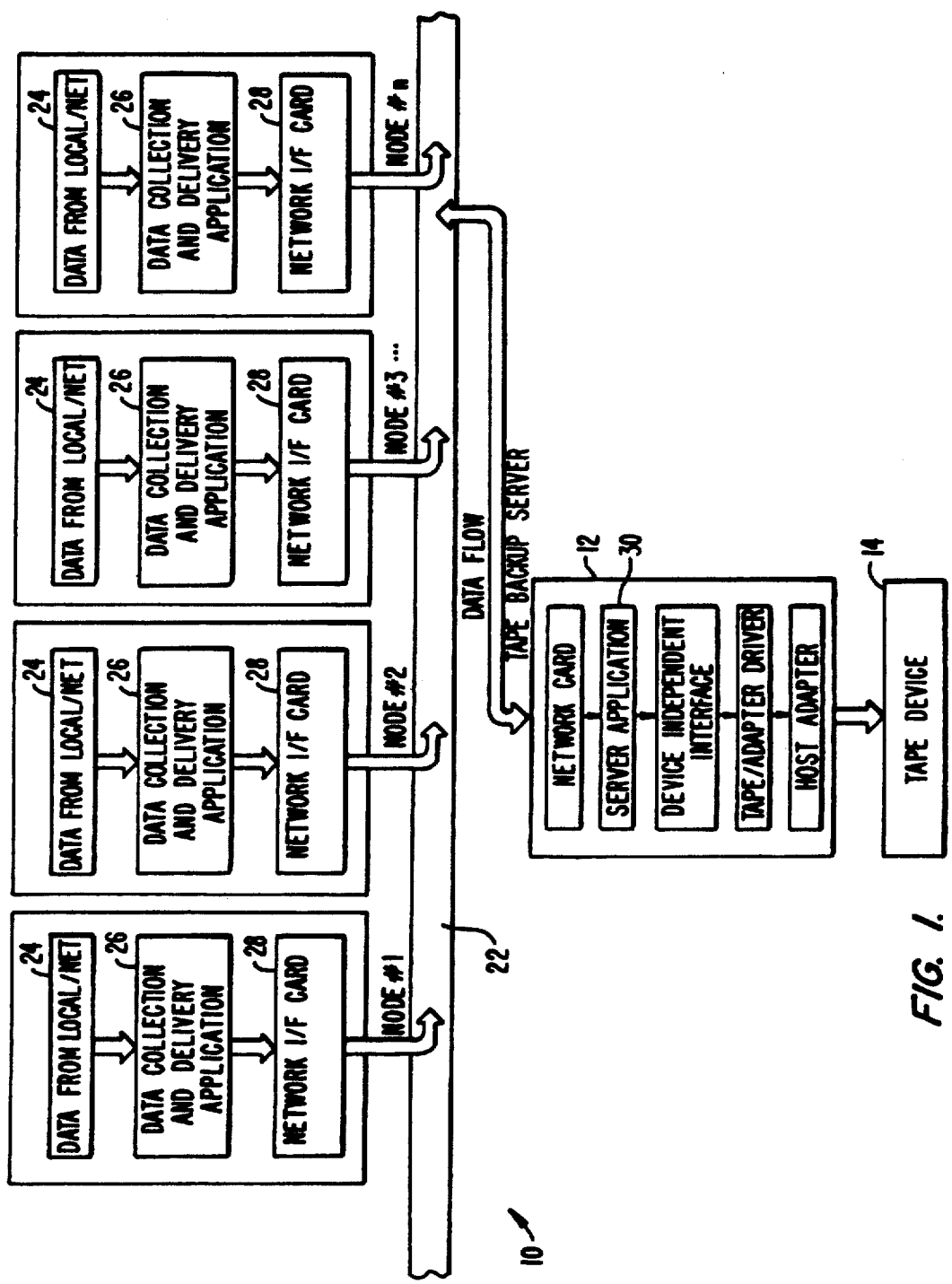
FIG. 1 is a system diagram of a network, a tape backup server, and a tape device to illustrate the preferred embodiment of the invention.

FIG. 1 is a system diagram of a network system 10, a tape backup server 12, and a tape device 14 to illustrate the preferred embodiment of the invention. Illustrated also in FIG. 1 are the different steps carried out at the nodes of system 10 and by server 12 to accomplish the backup function. As shown in FIG. 1, system 10 includes n nodes, all of which are collecting data and delivering it to a bus or network 22 for delivery to the tape device 14 (blocks 24, 26). The data collected is then sent through a network interface card and transferred to bus or network 22 (block 28). As will be described in more detail in reference to FIG. 2, not all the nodes deliver data to network 22 simultaneously; instead, the tape server 12 communicates with only one node at a time and the node delivers the data collected to the network 22 only when polled by server 12.

Upon receiving data from network 22, the server 12 performs certain monitoring of the nodes to be polled and tags each block of data before it is recorded by the tape device 14 so that the block of data can be easily retrieved (block 30). The block of data is then sent to device 14 for recording.

The data collection and delivery application step 26 in FIG. 1 will now be described in detail with reference to FIG. 2. For simplicity, the operation of step 26 will be illustrated by reference to node 1, it being understood that the operation of the step is similar for other nodes. At node 1, the processor collects and delivers data to a buffer memory (not shown in FIG. 1). It may also be desirable for the processor to compress the data collected before it is stored in the buffer to reduce the amount of data &o be delivered and written on tape (block 50) as described further below. The processor then checks to see if the buffer is full of data (diamond 52). If the buffer is not full, the processor checks to see if the data backup operation for node 1 has been completed (diamond 54). If the backup operation has not been completed, the processor returns to block 50 to collect more data and deliver data to the buffer. If the buffer is full of data or if the backup operation has been completed, the processor at node 1 waits for a request from the tape server 12 for data (block 56, diamond 58). The processor continues to wait until it has received a request upon which it sends the buffered data to server 12 (block 60). The processor at node I then receives the latest tape position at which the buffer of data has been recorded on tape from the tape server (block 62). Such position information is then recorded in the backup database (not shown in FIG. 1) of node 1 (block 64). While the flowchart is shown such that the position information of each block is recorded in the database, it will be understood that in many situations, recording the starting location of each file having many bufferfulls of data is adequate and is within the scope of the invention. The processor then checks to see if the backup operation has been completed (diamond 66). If the operation has not been completed, the processor returns to block 50 and repeats the above-described routine until the backup operation has been completed at node 1.

Figure 2:
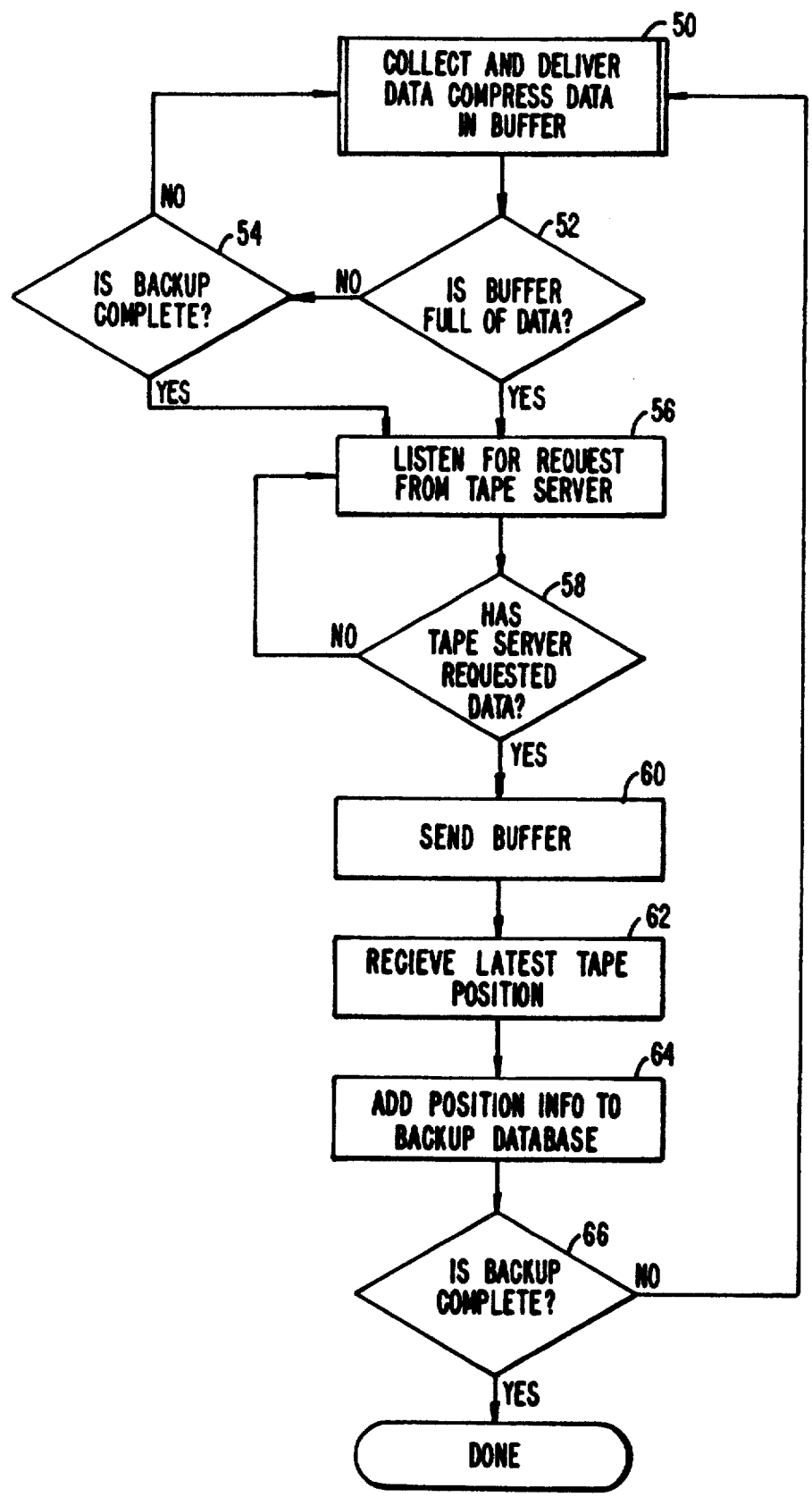
FIGS. 2 and 3 are two flow charts to illustrate in more detail two of the blocks in FIG. 1.

As is evident from the above description in reference to FIG. 2, the processor does not send out a block of data until it is requested by the tape server. Thus while the tape server is polling other nodes, the processor at node 1 has adequate time to collect data and fill the buffer before it is again polled by the tape server.

The operation of the server application block 30 in FIG. 1 will now be described in detail in reference to FIG. 3. Not all of the n nodes in system 10 of FIG. 1 are necessarily all collecting data for backup purposes at the same time. For this reason, server 12 only keeps track of the nodes at which data is collected for backup purposes. Thus server 12 keeps a list of nodes which are performing the backup operation. For this purpose, it needs to perform a scheduling routine as follows.

First, it sends out a wakeup call to all the nodes and makes a list of all the nodes which respond to the call. The server then selects a subset (may be an arbitrary number) of the nodes (for example, only those nodes which are performing backup operation, or even only some of them) as active. The server then rotates through the subset to deliver each node address for the purpose of polling the nodes in the subset. As the nodes in the subset complete their backup operation, these nodes are replaced by new nodes at which data collection for backup purposes is desired, to fill the subset. The steps of rotation through the subset for polling purposes and the step of replacing nodes after completion of backup by new nodes as described above are repeated until the backup operation at all the nodes has been completed.

Figure 3:
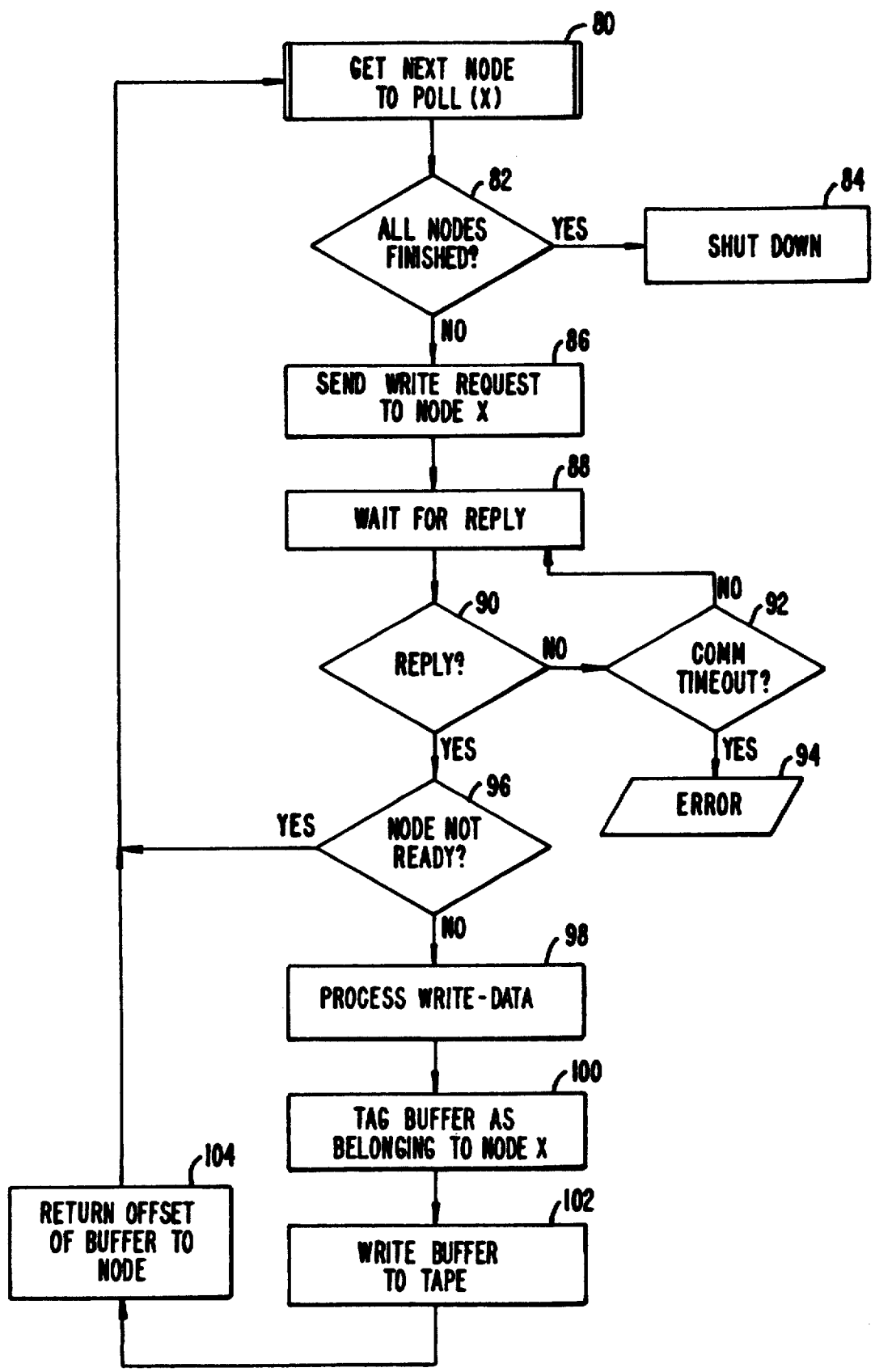

In reference to FIG. 3, the server goes through its subset of nodes in any predetermined order to select the next node to poll, which may be node x (block 80). The server then checks to see if the backup operation at all the nodes has been finished (diamond 82). If backup operation has been completed at all the nodes, the tape server has completed its mission and will therefore shut down (block 84). If not, the server then sends a write request to node x and waits for a reply (blocks 86, 88). The server checks for the presence of a reply (diamond 90) and if there is no reply before a communication time limit set in the network times out (diamond 92) the server concludes that there must have been an error in the system and therefore notify the different nodes accordingly (block 94). If a reply is received before the time limit, the server checks to see whether node x is ready to send a buffer of data (diamond 96). If the node is not ready, the server returns to block 80 to poll the next node in its subset. If node x is ready to send data and sends a buffer of data, the server then processes the data and tags the data as belonging to node x and causes the buffer of data to be written by device 14 (blocks 98, 100, 102). The server then sends the tape position where the last buffer of data is written to node x (block 104) and returns to block 80 to poll a different node in its subset of nodes. This operation is then repeated until the backup operation of all the nodes is finished and the server shuts down.

Figures 4A, 4B:
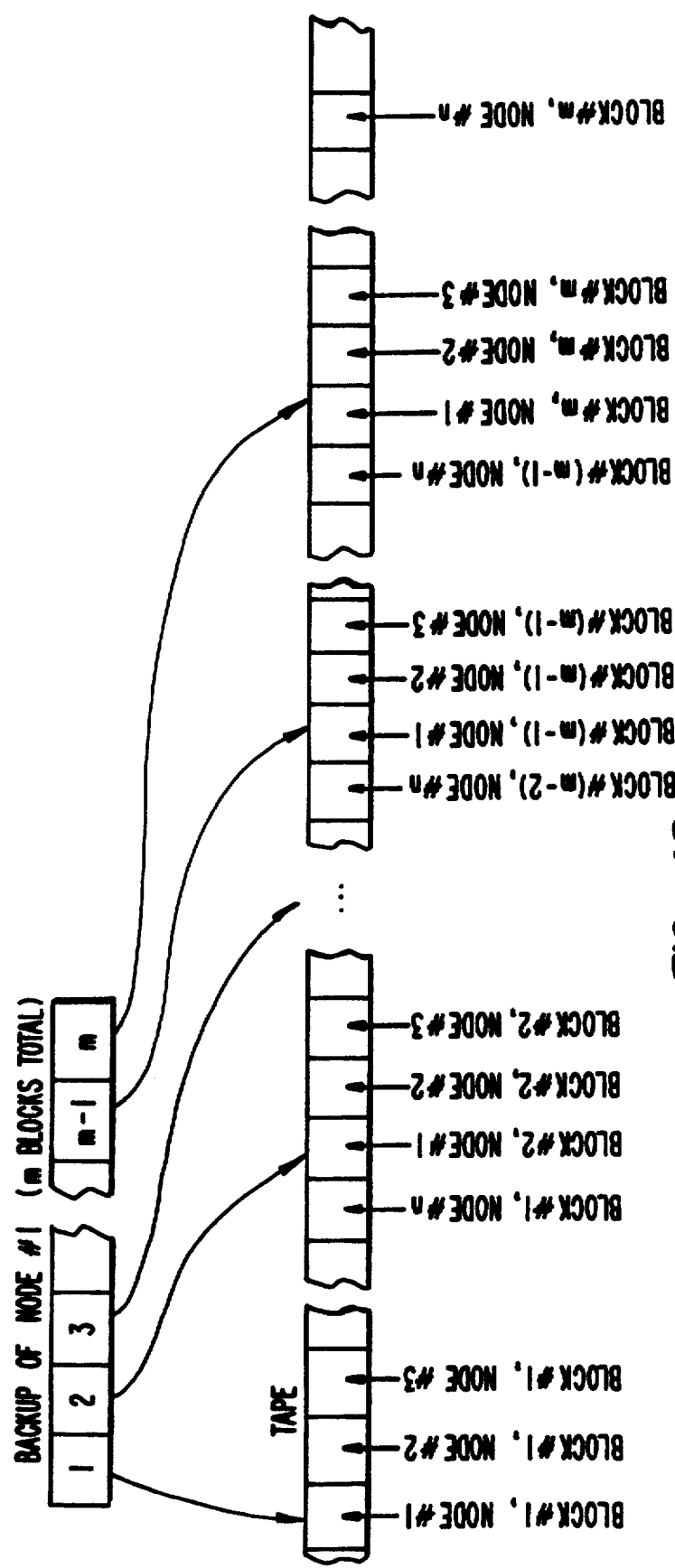
FIG. 4A is a schematic diagram illustrating the data recorded onto a tape in accordance with a conventional tape backup system.
FIG. 4B is a schematic view to illustrate the interleaved blocks of data recorded on a tape in accordance with the preferred embodiment of the invention.

The format of the data recorded on tape as a result of this invention in contrast to that in conventional systems is illustrated by reference to FIGS. 4A, 4B. FIG. 4A is a schematic diagram illustrating the format of data recording on tape by the conventional tape device backup system. As indicated above, in a conventional tape backup system, the tape device communicates with only one node at a time and continues the communication until the backup operation for such node has been completed. For this reason, the backup data from each node is recorded as one large block, separate and distinct from the blocks of data from other nodes, as shown in FIG. 4A. But, as also noted above, the streaming speed of the tape device is much faster than the rate of data collection at the nodes so that the tape device is continually waiting for data to be sent by the node performing backup. For this reason the section of the tape recording the backup data from, for example node 1, may contain many blanks. The tape device may even have fallen out of the streaming mode caused by undue delay in waiting for data from node 1 before the backup operation at node 1 has been completed.

Figure 5A:
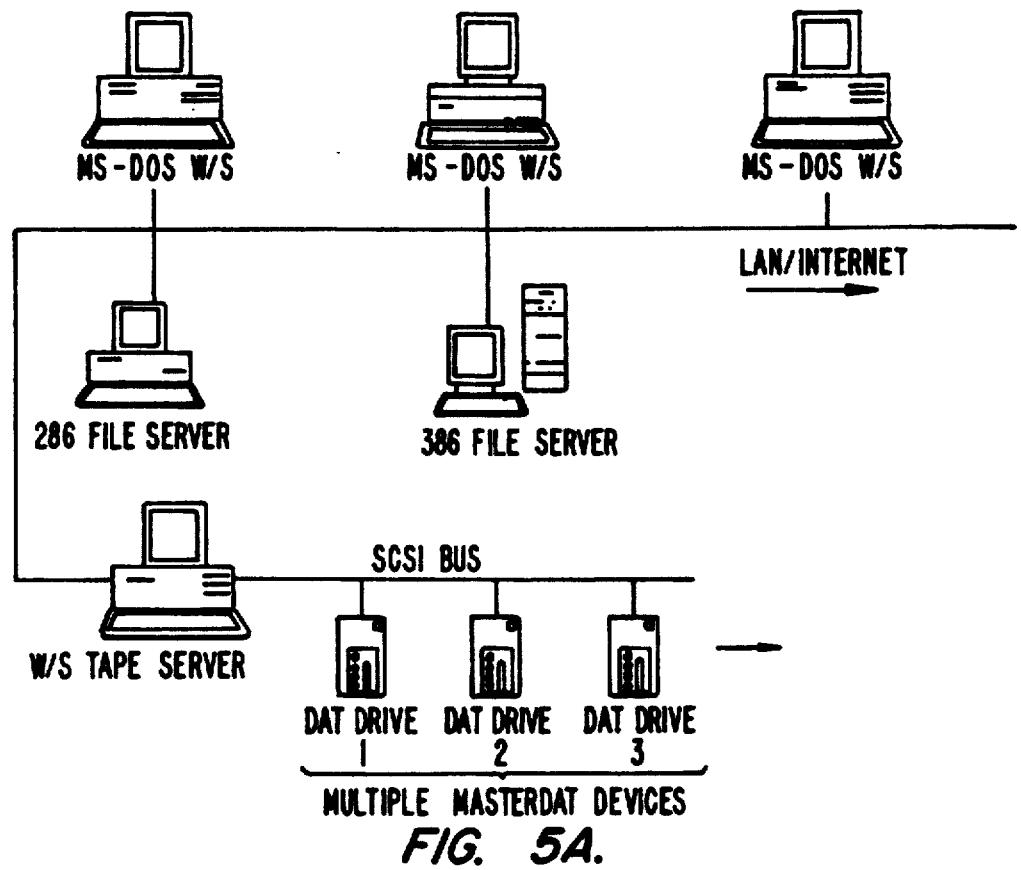
FIG. 5A is a block diagram of a single local area network with a tape server and a number of tape backup recording devices to illustrate the invention.
Figure 5B:
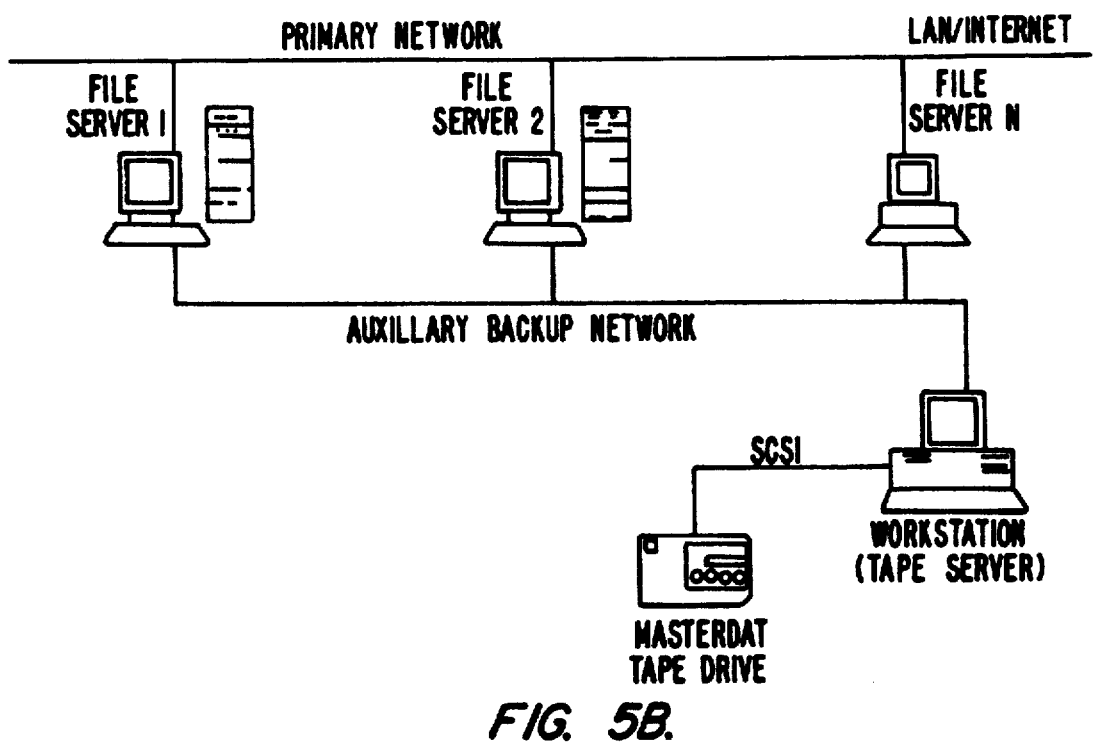
FIG. 5B is a block diagram of a multiple local area network system with a tape server and a tape backup recording device to illustrate the preferred embodiment of the invention.

FIG. 4B is a schematic view illustrating the layout of data from n nodes, with m blocks each of backup data. Thus the tape server polls node 1 and receives block 1 of data from node 1 and causes the block to be recorded and tagged on tape (as originating from node 1) as shown in FIG. 4B. The tape server then polls node 2 and retrieves data block 1 from node 2, tags it (as originating from node 2) and records the block on the section of the tape contiguous to that for recording block 1 from node 1. The tape server then rotates the polling procedure through the n nodes until the first block of data from all n nodes has been sequentially recorded as shown in FIG. 5B.

The tape server then proceeds to re-poll node 1 for the tagging and recording of data block 2. The server again repeats the polling procedure for all n nodes for the second block of data and causes these blocks to be sequentially recorded on tape as shown in FIG. 4B. The above polling routine is repeated for all m blocks of data from all n nodes to complete the backup procedure.

Thus after the tape device has recorded the data block 1 from node 1, the tape device and the tape server will proceed to poll and record data from the remaining $(n-1)$ nodes for their first block of data; during this time, node 1 has the time to collect its block 2 of data before the tape server returns to poll node 1 for the second block of data. In other words, while the tape server is waiting for the first node to complete its operation in collecting the block 2 of data, the tape device is not sitting idly but is instead recording the block 1 of data from the remaining $(n-1)$ nodes.

The above-described scheme is analogous to a multiplexing scheme. The n nodes together supply an abundance of data for feeding to the tape device so that the device does not fall out of streaming mode and so that at least the number of blanks recorded on tape will be reduced. While the invention is illustrated by reference to n nodes with m blocks each, it will be understood that the nodes may have a different number of blocks of backup data and the above-described operation will function essentially in the same manner.

When it is desired to restore the interleaved data to the different nodes, the tape server acts exactly as a normal remote tape server (that is, it responds to low level commands such as read block, write block, seek to block, rewind tape, erase tape, and so forth) with one exception. When responding to a read tape command, it will skip blocks of data which are not tagged as belonging to the requesting node. The node which requests restoration knows the start position of each file on tape since the position of each block (or at least the start position of each file) has been recorded in the backup database (see block 64 of FIG. 2). The node therefore can readily access the file on tape. When the tape server processes &he interleaved blocks of data such as that shown in FIG. 4B, it discards all blocks of data not tagged for the requesting node and this operation is completely transparent to the requesting node. For this reason, the restore operation for each node is essentially the same as that performed in present systems and will not be described in detail. Briefly, the restoration procedure at the node includes user selection of items to restore, obtaining the tape locations of these items from the backup database, seeking (remotely) to tape position, reading the blocks of data from the tape until restoration is complete.

ADVANTAGES OF THE INVENTION

Current applications make the file server host to the tape device because it brings the device into close proximity with a large concentration of data. Because this new technology does no&: require such proximity to provide high performance, we can eliminate the multitude of problems that come with such a configuration.

For example, the VAP (Value Added Process) environment provided for server based applications in Netware 286 is very subjective. It requires that every VAP be "well-tempered," giving up the processor and other system resources regularly. VAPs are far more intimate with the OS than a third party application should be.

It is no surprise, therefore, that most of these backup systems have been plagued with incompatibilities that can hang the server. It remains to be seen whether the NLM concept of Netware 386, which also requires this "nice guy" form of development, is able to improve the situation.

This brings us to another drawback of server-based backup. Large scale upgrades to the server O/S, such as the change from Netware 286 to Netware 386 require a full rework of the application. Such reworks result in long delays for the end-user. Some vendors have yet to complete a 386 solution after a year of availability.

The portability issue extends to other environments such as portable netware. Administrators will require a full-featured shared tape backup application which can back up work stations and, optimally, the Netware partition on the server. It is currently impossible to port a server-based application for this task since portable netware does not generally support NLMs. If that problem could be overcome, one is then faced with the variety of hardware environments requiring personal attention. By comparison, this invention provides a high performance, shared solution for Netware 286, Netware 386, and even Portable Netware.

The non-preemptive nature of the Netware operating system is highly optimized for the function of serving files. This invention benefits from that design rather than working against it and polling file server resources from that function. I believe that it will eliminate indefinitely any perceived advantages of server-based backup systems.

The Shared Backup Resource

Finally, after arriving at the "archive server," backup data is transferred to a shared backup resource via a high performance SCSI host adapter. Depending on performance and capacity requirements, this resource may consist of one or more SCSI based streaming tape devices.

A daisy-chaining configuration using this invention has an important advantage over similar configurations used in mini-computer applications. Rather than interspersing contiguous data over multiple tapes, our matrix configuration distributes the data according to user, keeping all data from a particular user's backup session on one tape. This avoids the problem of losing an entire network backup if one tape is lost of damaged.

LAN backup technology has been considered from a static point of view by identifying and comparing the components of these applications. I wish to complete the discussion by focusing on the dynamics of day to day operation and the issues which administrators will consider as their data management needs grow and change.

Data Compression

Data compression becomes an important issue in a backup application. It can increase the data capacity of the backup media and, if properly employed, can further increase backup speeds. The best point at which to compress data is at the node from where it originates. This increases the perceived performance of network communications, the backup or archive server, host adapter, and tape device. For current LAN backup applications, this would be impractical, since compression algorithms run so slowly on most work stations that they become bottlenecks themselves.

Although non-network environmonts can benefit in terms of performance from tape devices and host adapters which house data compression chips, LAN environments cannot, since the bottleneck in these applications is the transfer of data over the network. In the distributed processing application described herein, however, multiple nodes can be employed simultaneously to perform compression. It has become a very effective way of backing up data at a rate which is higher than the network bandwidth. If the data being transmitted is, say, half its original size, then one has effectively doubled the network transfer rate, tape streaming speed and tape capacity.

It is also important to note that a better type of data compression can be performed at work stations than the type used in lost adapters, communication cards and other data transfer devices. These latter devices use "real time" agorithms which look at small (usually 8 k) blocks of data and must compress on a single pass through the data. Work stations can generally look at larger blocks of data (64–128 k) which can lead to more efficient compression. Work station compression can be file oriented, thus benefiting from the homogeneity inherent within files. Finally, multiple passes can be performed allowing for up front analysis of the data to determine the optimal compression strategy.

Communication Strategies

As was mentioned, this new approach to LAN backup takes full advantage of a &ape device by streaming it during backup of the entire LAN. For administrators of large or growing networks this is just part of the solution. In such cases, multiple tape devices are needed to back up all LAN data within a reasonable time frame. In these situations, the limit becomes the number of devices one can drive with a single archive server. This invention allows multiple archive servers to co-exist on a single I.N, as shown in FIG. 5A. This is particularly advantageous when a high throughput network backbone is used (such as fiberoptics).

With distributed processing, backup data will be abundant in a LAN environment even for the faster streaming devices of the future. Since the normal functionings of a growing network will dictate movement to higher speed networking hardware, &he distributed processing solution discussed will be the most adaptive solution for growing networks as it will automatically take advantage of increasing throughput capabilities of these network and tape backup resources.

In some instances, the preempting of normal network operations for backup is not an option. Although current applications which dedicate a tape device to a file server or work station can eliminate heavy network traffic, the sheer number of tape devices needed can be equally prohibitive. This invention makes it possible to share devices in such an environment by means of an auxiliary network, as illustrated in FIG. 5B.

Although networking is a fast growing, ever changing industry, there are some constants with regard to LAN backup which can be identified. The storage capacities of the high-end devices employed in LAN backup, such as DAT and other streaming tape devices, will continue to be very large compared to those of primary storage devices. Also the streaming rate of these devices will continue to be very large compared with the overall speed of the disk accessing and administrative overhead performed in backup applications.

A distributed processing LAN backup application not only allows multiple nodes on a network to share such devices, but it allows them to work together to take maximum advantage of device capabilities. In this way, network computing will no longer be a burden but an asset in performing economical, centralized, high performance archival and shared backup.

While the invention has been described by reference to various preferred configurations, it will be understood that various changes and modifications may be made without departing from the scope of the invention which is to be limited only by the appended claims.

What is claimed is:

1. A system for storing data collected by a plurality of nodes in backup operations, each node having a buffer for storing data to be backed up, said nodes collecting and storing data in their buffers, said system comprising:
    communication means connecting the nodes;
    at least one tape recording device; and
    at least one tape server connected to the at least one device and connected to the nodes through the communication means, said server polling said nodes through the communication means on whether the nodes have filled their buffers with data for storage by the at least one device or completed backup data storage even though its buffer is not filled, and, for each node polled, causing a block of data from the node polled to be recorded by the at least one device when said node that is polled has filled its buffer with data for storage by the at least one device or when the node polled has completed backup data storage even though its buffer is not filled while at least one other node to be polled is concurrently collecting and storing data in its buffer, said server polling a different node for data storage when any node polled has not filled its buffer with data for backup data storage and not completed backup data storage when polled by the tape server, said server polling all the nodes and causing blocks of data collected by the nodes to be recorded by the at least one device until all data from all the nodes to be backed up are caused to be recorded by said at least one device, said server causing the blocks of data from different nodes to be interleaved on tape when recorded by the at least one device.

2. The system of claim 1, said server causing blocks of data collected by the nodes to be recorded by the at least one device, said server multiplexing the blocks of data from different nodes before the blocks are recorded by the at least one device.

3. The system of claim 1, said server causing blocks of data collected by the nodes in their buffers to be recorded by the at least one device, wherein the at least one device provides locations of data blocks recorded on tape, and wherein the server sends the tape locations of data blocks recorded to the nodes from which the blocks originated.

4. The system of claim 1, said communication means including a bus connecting said nodes, said system further comprising an auxiliary backup bus for connecting the at least one tape server to the at least one device.

5. The system of claim 1, wherein the server tags each block of data with information to identify the node from which the block originated, wherein during a restore operation, the server will cause only the blocks tagged with information on tape identifying them as originating from a particular node to be restored.

6. The system of claim 5, wherein said server skips blocks of data on tape not tagged with information identifying the blocks as originating from said particular node when said particular node requests said tagged blocks of data.

7. The system of claim 1, said system including a plurality of tape recording devices connected in a daisy-chain configuration to said at least one server.

8. A network system comprising:
    a plurality of nodes, each having a buffer for storing data to be collected for tape storage, said nodes collecting data and storing the data collected in their buffers;
    communication means connecting the nodes;
    at least one tape recording device; and
    a tape server connected to the at least one device and the nodes through the communication means, said server polling the nodes on whether the nodes have filled their buffers with data for tape storage or completed backup data storage even though their buffers are not filled, and, for each node polled, causing a block of data from the node polled to be recorded by the at least one device when the node polled has filled its buffer with data for storage by the at least one device or when the node polled has completed backup data storage even though its buffer is not filled while at least one other node that is to be polled is concurrently collecting and storing data in its buffer, said server polling a different node for backup data storage when any node polled has not filled its buffer with data for backup data storage and not completed backup data storage when polled by the server, said server polling all the nodes and causing blocks of data collected by the nodes to be recorded by the at least one device until all data from all the nodes to be backed up are caused to be recorded by said at least one device, said server causing the blocks of data from different nodes to be interleaved on tape when recorded by the at least one device.

9. The system of claim 8, wherein at least one of said nodes compresses the data stored in its buffer before the compressed data is caused by the server to be stored by the at least one device.

10. The system of claim 8, wherein at least one node has a backup database for storing tape positions of blocks stored on tape, where the blocks stored originated from the at least one node.

11. The system of claim 10, wherein the server tags each block of data with information to identify the node from which the block originated, wherein during a restore operation, the server will cause only the blocks tagged with information on tape identifying them as originating from a particular nod to be restored.

12. The system of claim 11, wherein said server skips blocks of data on tape not tagged with information identifying the blocks as originating from said particular node when said particular node requests blocks of data whose positions are stored in its backup database.

13. The system of claim 8, said system including a plurality of tape recording devices connected in a daisy-chain configuration to said at least one server.

14. A method for data backup in a network system which comprises (a) a plurality of nodes, each having a buffer for storing data to be collected for tape storage; (b) communication means connecting the nodes; (c) at least one tape recording device; and (d) a tape server connected to the at least one device and the nodes through the communication means, said method comprising:
  causing said nodes to collect data and fill their buffers with said data;
  polling said plurality of nodes on whether the nodes polled have filled their buffers with data for tape storage and whether the nodes polled have completed backup data storage even though their buffers are not filled;
  causing a block of data from the buffer of each node polled to be recorded on a tape by the at least one device when the node polled has filled its buffer with data for storage by the at least one device or when he node polled has completed backup data storage even though its buffer is not filled while causing at least one other node that is to be polled to concurrently collect and store data in its buffer, and skipping the node polled when it has not filled its buffer with data for backup data storage and not completed backup data storage when polled by the server; and
  repeating said polling step and repeating said causing or skipping step for each of the nodes until all data from all the nodes to be backed up are caused to be recorded by said at least one device, and causing the blocks of data from different nodes to be interleaved on tape when recorded by the at least one device.

15. The method of claim 14, wherein said causing step is such that when data form the buffer of the node polled is caused to be recorded on tape by the server, the remaining nodes are caused to fill their buffers with data.

16. The method of claim 14, wherein said step causing data to be recorded includes the step of tagging the tape with information concerning the node from which the data originated and recording said information on said tape contiguous to said data.

17. The method of claim 14, wherein said step causing data to be recorded causes blocks of data from different nodes to be interleaved along the tape when recorded on said tape.

18. The method of claim 17, said method further including the step of detecting tape location of said blocks of data and recording the tape location in a backup database of said node from which the blocks of data originated.

19. A method for data restoration in a network system which comprises (a) a plurality of nodes, each having a buffer for storing data to be collected for tape storage; (b) communication means connecting the nodes; (c) at least one tape recording device; and (d) a tape server connected to the at least one device and the nodes through the communication means, wherein blocks of data have been recorded on a tape by said at least one device, the tape having been tagged with information concerning nodes from which the blocks of data originated, the tape location of the blocks of data being stored in backup databases at the originating nodes of said blocks, and wherein blocks of data from different nodes are interleaved along the tape, said method comprising:
  obtaining from the backup database of a selected node the tape locations at which blocks of data from said selected node are recorded on said tape; and
  seeking said locations on said tape obtained from the backup database of said selected node and reading from the tape at such locations blocks of data from the tape that are tagged as originating from the selected node while skipping the blocks of data that are not so tagged.

20. A system for storing data collected by a plurality of nodes in backup operations, each node having a buffer for storing data to be backed up, said nodes collecting and storing data in their buffers, said system comprising:
  communication means connecting the nodes;
  at least one tape recording device; and
  at least one tape server connected to the at least one device and connected to the nodes through the communication means, said server polling said nodes through the communication means on whether the nodes have filled their buffers with data for storage by the at least one device or completed backup data storage even though its buffer is not filled, and, for each node polled, causing a block of data from the node polled to be recorded by the at least one device when said node that is polled has filled its buffer with data for storage by the at least one device or when the node polled has completed backup data storage even though its buffer is not filled, said server polling a different node for data storage when any node polled has not filled its buffer with data for backup data storage and not completed backup data storage when polled by the tape server, said server polling all the nodes and causing blocks of data collected by the nodes to be recorded by the at least one device until all data from all the nodes to be backed up are caused to be recorded by said at least one device, said server causing the blocks of data from different nodes to be interleaved on tape when recorded by the at least one device.

* * * * *

UNITED STATES PATENT AND TRADEMARK OFFICE
CERTIFICATE OF CORRECTION

PATENT NO. : 5,212,772
DATED : May 18, 1993
INVENTOR(S) : Daniel R. Masters

It is certified that error appears in the above-identified patent and that said Letters Patent is hereby corrected as shown below:

Cover Page, [73] Assignee: Replace "Gigatrend" with --GigaTrend--

Column 11, line 8, in Claim 11: Replace "nod" with --node--

Column 11, line 38, in Claim 14: Replace "he node" with --the node--

Column 11, line 55, in Claim 15: Replace "form the buffer" with --from the buffer--

Column 12, line 18, in Claim 19: Replace "tape location" with --tape locations--

Signed and Sealed this

Twenty-fifth Day of January, 1994

*Attest:*

BRUCE LEHMAN

*Attesting Officer*     *Commissioner of Patents and Trademarks*